United States Patent
Taki et al.

(10) Patent No.: US 9,272,604 B2
(45) Date of Patent: Mar. 1, 2016

(54) MOLDING FOR VEHICLE AND ATTACHMENT STRUCTURE OF MOLDING IN VEHICLE

(71) Applicant: TOKAI KOGYO CO., LTD., Obu-shi, Aichi (JP)

(72) Inventors: Hiroyuki Taki, Obu (JP); Yuki Kano, Obu (JP)

(73) Assignee: TOKAI KOGYO CO., LTD., Obu-shi (JP)

(*) Notice: Subject to any disclaimer, the term of this patent is extended or adjusted under 35 U.S.C. 154(b) by 0 days.

(21) Appl. No.: 14/540,349

(22) Filed: Nov. 13, 2014

(65) Prior Publication Data
US 2015/0128522 A1    May 14, 2015

(30) Foreign Application Priority Data

Nov. 14, 2013 (JP) .................................. 2013-235808
Sep. 25, 2014 (JP) .................................. 2014-195002

(51) Int. Cl.
*B60J 1/00* (2006.01)
*B60J 10/00* (2006.01)
*B60R 13/04* (2006.01)

(52) U.S. Cl.
CPC .............. *B60J 1/006* (2013.01); *B60J 10/0062* (2013.01); *B60R 13/04* (2013.01)

(58) Field of Classification Search
CPC .... B60J 10/02; B60J 10/0051; B60J 10/0054; B60J 1/006; B29C 45/0003; B29D 99/0053; B29K 2101/00; B29L 2031/3041
USPC ................................ 296/93, 146.15; 52/716.5
See application file for complete search history.

(56) References Cited

U.S. PATENT DOCUMENTS

| | | | | |
|---|---|---|---|---|
| 4,322,105 | A * | 3/1982 | Onda | 296/93 |
| 4,683,694 | A * | 8/1987 | Ziegler | B60J 10/0005 296/93 |
| 5,456,049 | A * | 10/1995 | Goto et al. | 52/208 |
| 6,096,402 | A * | 8/2000 | Tamura | 428/114 |
| 6,676,194 | B2 * | 1/2004 | Pfertner et al. | 296/146.15 |
| 7,182,397 | B1 * | 2/2007 | Desai | 296/192 |
| 7,837,251 | B2 * | 11/2010 | Rich et al. | 296/146.15 |
| 8,215,700 | B2 * | 7/2012 | Alvarez et al. | 296/146.9 |
| 8,505,262 | B2 * | 8/2013 | Senge | B60J 10/0051 296/1.08 |
| 8,898,958 | B2 * | 12/2014 | Filipczak et al. | 49/502 |
| 2012/0137628 | A1 * | 6/2012 | Brandt | B60R 13/06 52/716.5 |
| 2012/0205940 | A1 * | 8/2012 | Sitterlet et al. | 296/146.15 |
| 2015/0061313 | A1 * | 3/2015 | Watou et al. | 296/93 |

FOREIGN PATENT DOCUMENTS

| | | | |
|---|---|---|---|
| JP | A-2003-165137 | | 6/2003 |
| KR | 2004044302 A | * | 5/2004 |
| KR | 2014029802 A | * | 8/2012 |

* cited by examiner

*Primary Examiner* — Pinel Romain
(74) *Attorney, Agent, or Firm* — Oliff PLC (57) ABSTRACT

An elongated molding for a vehicle, including, a body portion including a head portion and a leg portion protruding from a back surface of the head portion, wherein the molding has a lower terminal section, which is a portion of the molding located lower than a boundary between a side panel and a fender panel constituting a body panel and configured to face the fender panel, wherein a receiving portion, which is configured to receive a tip portion of an edge portion of the fender panel that faces the molding, is formed on an outer surface of the leg portion of the lower terminal section, and wherein the receiving portion includes a bottom wall portion projecting toward an outer side from the leg portion and a side wall portion projecting from an upper surface of the bottom wall portion.

15 Claims, 10 Drawing Sheets

(RELATED ART)

MOLDING FOR VEHICLE AND ATTACHMENT STRUCTURE OF MOLDING IN VEHICLE

CROSS-REFERENCE TO RELATED APPLICATIONS

This application claims priority from Japanese Patent Application No, 2013-235808 filed on Nov. 14, 2013, and Japanese Patent Application No. 2014-195002 filed on Sep. 25, 2014, the entire contents of which are incorporated herein by reference.

TECHNICAL FIELD

Aspects of the present invention relate to an elongated window molding (hereinafter simply referred to as a "molding") attached to, for example, a peripheral edge of a front window glass of a vehicle.

BACKGROUND

There are window moldings made of resin, which are molded by injection molding or the like. Among these window moldings, a window molding is known in which a seal body made of a soft resin material that is elastically deformable is integrated with a body portion made of a hard resin material that has relative rigidity. Such a molding may be referred to as a mold, a garnish, a decorative member, or the like. For example, JP-A-2003-165137 discloses a molding as an elongated composite resin molded product. The molding of JP-A-2003-165137 ("window edge molding 20" in the embodiment) is fixed along a side panel ("front pillar panel 2" in JP-A-2003-165137) of a passenger car via a mounting member (a "first fixture 50" and a "second fixture 60" in JP-A-2003-165137) made of resin or metal.

SUMMARY

In the molding that extends in the upper-lower direction along the inclination of the front window glass as described above, a lower end portion of the molding extends further downward than a lower end of the side panel (front pillar panel) and reaches a position where the lower end portion is adjacent to a fender panel (also called as a quarter panel) of the vehicle. In such a type of molding, there are concerns that problems as listed below may occur.

Figure 10:
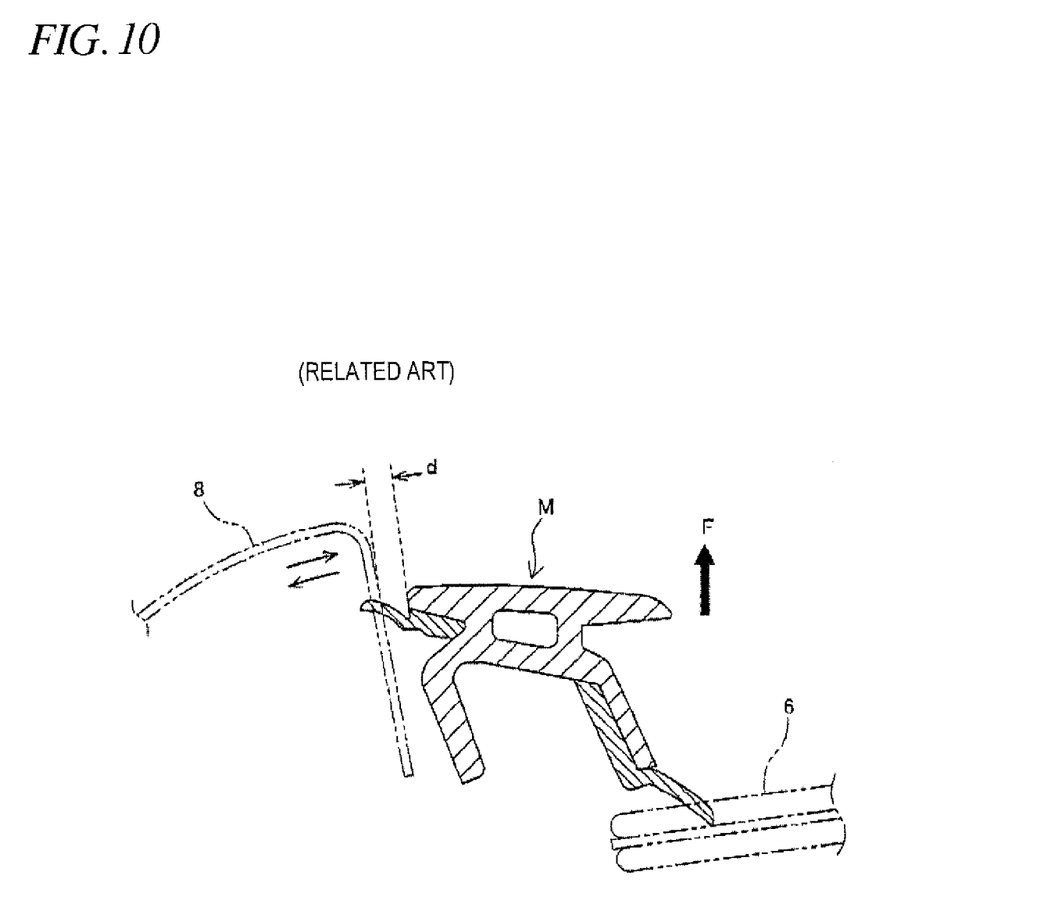
FIG. 10 is a schematic cross-sectional view for describing drawbacks of a related-art example.

<1> If the position of the fender panel with respect to the side panel varies in a vehicle width direction, a clearance between the fender panel and the molding (see the clearance d between the fender panel 8 and the molding M illustrated in FIG. 10) may become too large, and a seal lip of the molding may be separated from the fender panel, or the molding may be rattled.

<2> For example, when a glass surface is cleaned after attachment of the molding to a vehicle body, if a finger or a cleaning implement is caught in the molding and a force to lift the molding (see an arrow F illustrated in FIG. 10) is applied, there is a concern that the molding may be lifted with respect to the fender panel.

<3> Even if one attempts to install mounting members, such as clips, on an inner surface of the fender panel (surface at an engine hood side), the mounting members may be unable to be installed due to design restrictions. Further, even if it is possible to install the mounting members, the increase of the mounting members causes, in addition to an increase in installation cost, an increase in the number of parts or an increase in attachment man-hours, which is not preferable.

An object of an aspect of the invention is to provide a molding for a vehicle, which can be attached to a body panel in a state where generation of a gap or occurrence of rattling between body panels can be prevented as much as possible without increasing the number of parts, and an attachment structure of the molding in the vehicle.

(1) According to a first aspect of the invention, there is provided an elongated molding for a vehicle, which is attached between a peripheral edge of a window pane and a body panel, the molding including: a body portion including a head portion configured to be arranged at a front surface side of the window pane when the molding is attached to the vehicle, and a leg portion protruding from a back surface of the head portion and configured to be arranged at an end surface side of the window pane when the molding is attached to the vehicle, wherein the molding has a lower terminal section, which is a portion of the molding located lower than a boundary between a side panel and a fender panel constituting the body panel and configured to face the fender panel when the molding is attached to the vehicle, wherein a receiving portion, which is configured to receive a tip portion of an edge portion of the fender panel that faces the molding, is formed integrally with the leg portion of the lower terminal section on an outer surface of the leg portion, and wherein the receiving portion includes a bottom wall portion projecting toward an outer side from the leg portion of the lower terminal section, and a side wall portion projecting from an upper surface of the bottom wall portion toward the front surface side of the window pane.

(2) According to a second aspect of the invention, there is provided an attachment structure of a molding in a vehicle, the attachment structure including: the vehicular molding according to the first aspect; and the body panel including the side panel and the fender panel, wherein the edge portion of the fender panel is provided in the vicinity of a region adjacent to the side panel, and wherein the molding is mounted to the fender panel in a state where the receiving portion of the molding receives the tip portion of the edge portion of the fender panel that faces the molding.

According to the above-described aspects, the following effects can be obtained.

The position of the molding in the height direction with respect to the fender panel is regulated (or positioned) due to the engagement relationship between the bottom wall portion of the receiving portion and the tip portion of the edge portion of the fender panel, and the position of the molding in the width direction with respect to the fender panel is regulated (or positioned) due the engagement relationship between the side wall portion of the receiving portion and the edge portion of the fender panel. For this reason, even if there is a deviation in the position of the tip portion of the edge portion of the fender portion in an actual vehicle, due to the engagement relationship described above, an excessive gap between the fender panel and the molding can be prevented from being generated and the molding can be prevented from rattling. Further, a situation where the molding is lifted with respect to the fender panel due to an unintended external force can be avoided.

Further, the lower terminal section of the molding can be fixed to the fender panel due to the engagement relationship between the receiving portion and the fender panel edge portion, even without installing mounting members, such as clips, to the fender panel. Moreover, since the receiving portion is formed integrally with the leg portion, there is no need to newly mount a receiving portion equivalent member that is separately provided, and an increase in the number of parts can be prevented.

DETAILED DESCRIPTION

Hereinafter, a molding according to an embodiment of the invention will be described with reference to the drawings.

Figure 1:
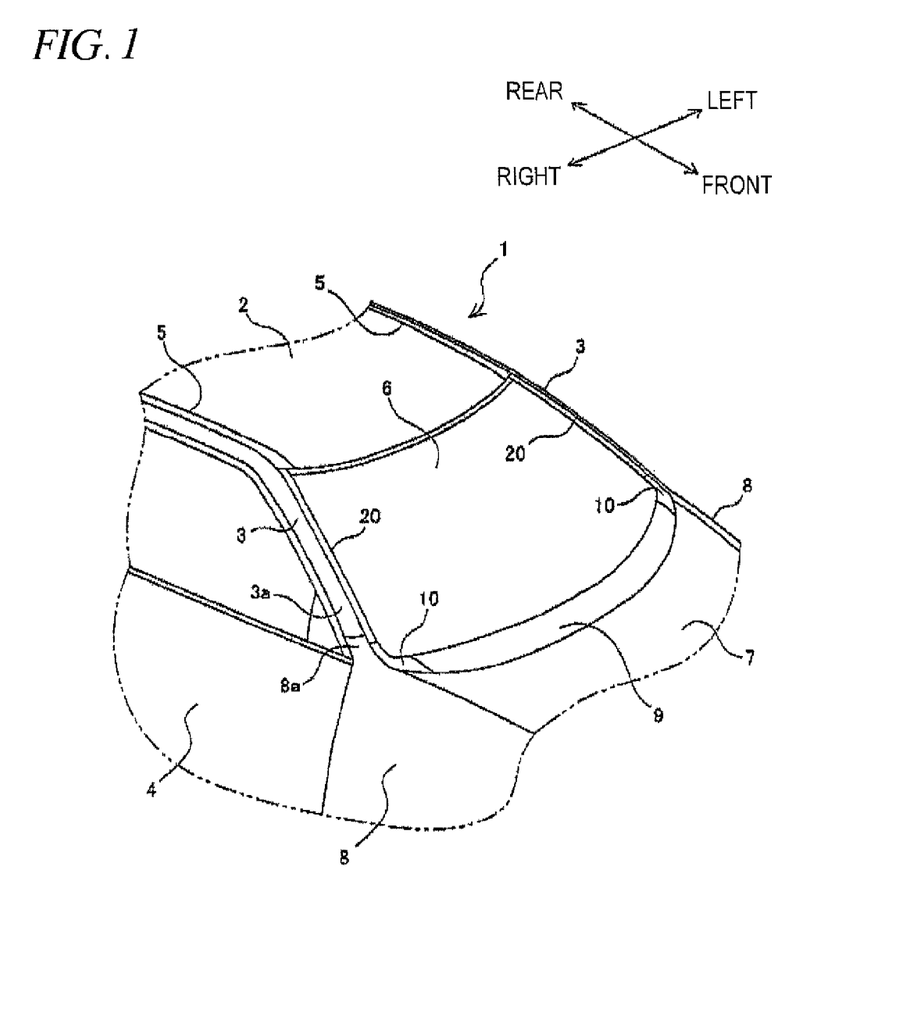
FIG. 1 is a perspective view viewed from the oblique front of a vehicle, illustrating a mounting situation of a molding.

FIG. 1 is a view when a front window glass of a general sedan type passenger vehicle and its peripheral portion are viewed from the oblique front side. A vehicle body of a passenger vehicle 1 illustrated in FIG. 1 is constituted of a plurality of types of body panels (2, 3, 4, and 8) and other members. Body panels that construct a passenger compartment space include a roof panel 2, and side panels 3 and door panels 4 located on both left and right sides of the roof panel. In the present example, a roof molding 5 made of resin is provided at a joint between each side portion of the roof panel 2 and each side panel 3. The side panel 3 extends further forward and obliquely downward than a front end edge of the roof panel 2. The side panels 3 (these portions are also referred to as "front pillar panels") that extend forward and obliquely downward are arranged along both left and right side portions of a front window glass 6 (hereinafter referred to as "window pane 6").

Figure 2:
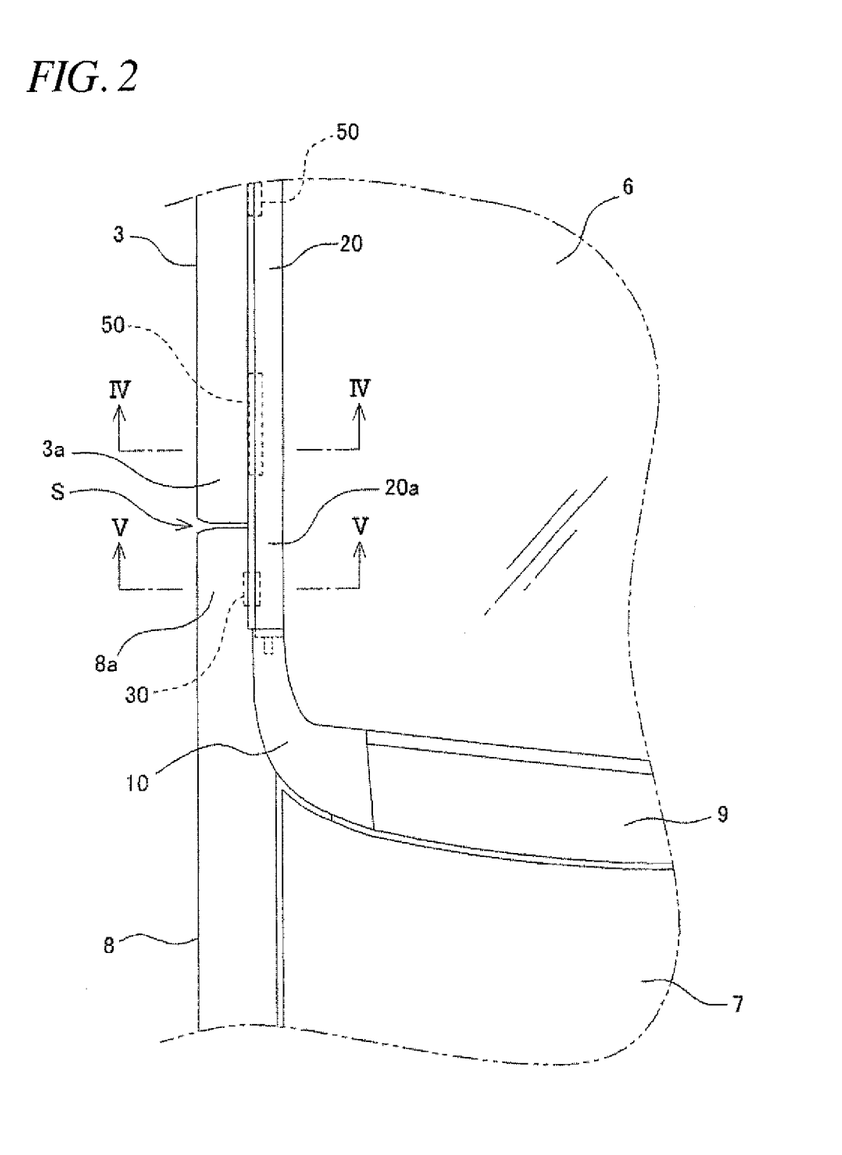
FIG. 2 is a plan view of a portion of a vehicle viewed from the top, illustrating the mounting situation of the molding.

Fender panels 8 are respectively provided at both left and right sides of an engine hood 7 that covers an upper surface of an engine storage room, and a rear half portion of each fender panel 8 is adjacent to the door panel 4. An upper end portion 8a of the fender panel rear half portion adjacent to the door panel 4 protrudes obliquely upward so as to face a front lower end portion 3a of the side panel 3, and is arranged in proximity with the front lower end portion 3a of the side panel (refer to FIGS. 1, 2, and 7). Symbol S in FIG. 2 represents a clearance formed between the front lower end portion 3a of the side panel and the rear half upper end portion 8a of the fender panel, and the position of the clearance S becomes a boundary between the side panel 3 and the fender panel 8.

A molding 20 of the present embodiment is an elongated resin member that is arranged along the side panel 3 and the rear half upper end portion 8a of the fender panel, is interposed between the side panel 3 and a side portion of the window pane 6 and between the fender panel 8 and a side portion of the window pane 6, and has a decorative function, a waterproofing function, and other functions. As illustrated in FIGS. 1 and 2, a cowl louver 9 is provided between a lower end portion of the window pane 6 and the engine hood 7, and baffle plates 10 are respectively provided at both left and right sides of the cowl louver 9. Each baffle plate 10 covers an interspace (not shown) formed between the cowl louver 9 and the fender panel 8 and covers a portion of a lower terminal section 20a of the molding 20 arranged within the interspace. Hereinafter, the lower terminal section 20a (refer to FIG. 3) of the molding 20 means a portion of the molding 20 that is located lower than a boundary (S) between the side panel 3 and the fender panel 8 that constitute the body panel and is configured to face the rear half upper end portion 8a of the fender panel when the molding 20 is attached to the vehicle.

In addition, the molding 20 is fixed to the side panel 3 by using clips 50 (see FIG. 7) as mounting members, and is positioned to the fender panel 8 via a receiving portion 30 (see FIGS. 5 and 6) provided at a portion of the molding. Members and structures, including the clips and the receiving portion, which are involved in the mounting of the molding 20 to the body panel (3, 8), will be sequentially described.

Figure 3:
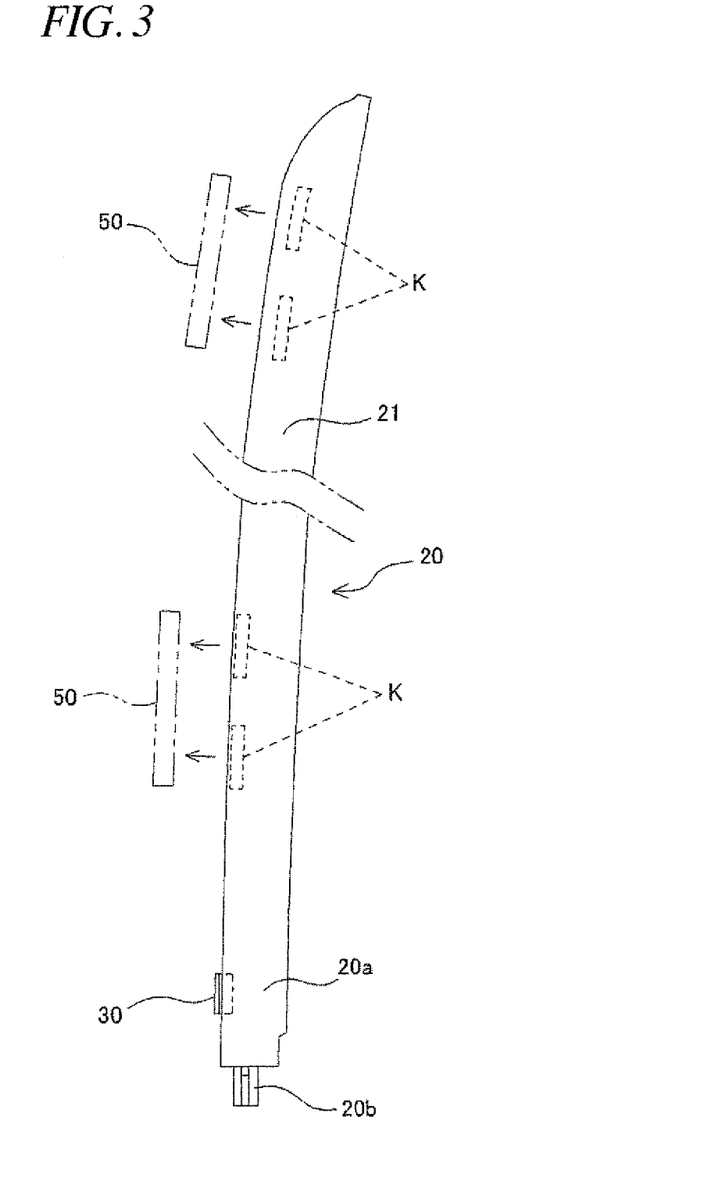
FIG. 3 is a schematic front view of the molding according to an embodiment.

FIG. 3 is a schematic front view of the right-side molding 20 interposed between the right side panel 3 and a right side portion of the window pane 6 of FIG. 1 (a front view in which an intermediate portion of the molding 20 is omitted and only the vicinities of the upper end portion and the lower end portion are illustrated). Although a right-side molding and a left-side molding having a line-symmetrical shape relationship with respect to the right-side molding are mounted in a pair on an actual vehicle, the right-side molding will be described in the present specification and drawings.

Figure 7:
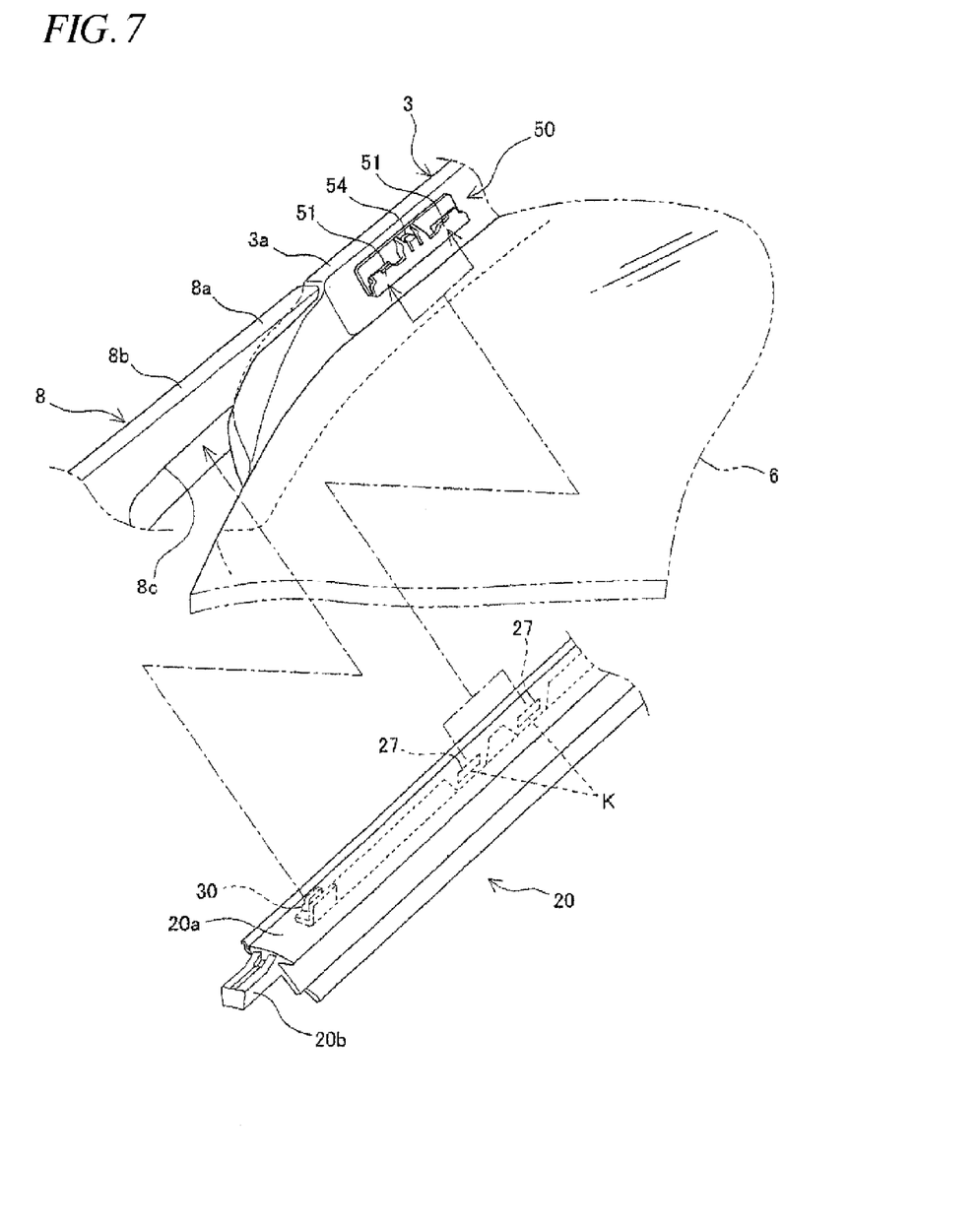
FIG. 7 is a perspective view illustrating the attachment outline of the molding to a body panel.

As illustrated in FIG. 3, a body portion of the molding 20 has an elongated shape that is vertically (upper-lower direction of FIG. 3) long. The front of the molding body portion illustrated in FIG. 3 is a "front surface", and this front surface constitutes a decorative surface 21. Additionally, among various structures provided on a back surface side of the molding body portion, only the structures which participate in the mounting of the molding 20 to the body panel (3, 8) are drawn by a dashed line or the like in FIG. 3. Namely, the molding 20 of the present embodiment is attached to the side panel 3 by using five clips 50. A total of five engagement pairs (K, K) each including two engaging portions K are provided on the molding 20 side so as to correspond to the five clips (only two engagement pairs including an engagement pair located on the uppermost side and an engagement pair located on the lowermost side are illustrated in FIG. 3). That is, as illustrated in FIGS. 3 and 7, one clip 50 is allocated to one engagement pair (K, K) of the molding 20.

The molding 20 of the present embodiment is formed by two-process injection molding using two kinds of resin materials, that is, "hard resin (material)" and "soft resin (material)". Here, the "hard" and the "soft" are terms that express the relative relationship of hardness or softness between the two resin materials. Namely, the "hard resin (material)" means resin (material) harder than soft resin (material), and the "soft resin (material)" means resin (material) softer than the hard resin (material). Although the hard resin (material) and the soft resin (material) generally consist of different materials, the hard resin (material) and the soft resin (material) can also be prepared from the same kind of resin material so long as the hard/soft materials can be separately made from each other depending on a difference in molecular weight or the presence/absence of a plasticizer and other additives even if the materials are substantially the same materials. In addition, preferable hard resin (material) includes AES resin, ABS resin, PP resin, PPO resin, polycarbonate (PC) resin, polyamide (PA) resin, or alloy resin thereof. Preferable soft resin (material) includes thermoplastic elastomer (TPE), TPE has a unique feature that molding processing is possible similar to general-purpose plastic, though TPE behaves like an elastomer (elastic body) at normal temperatures and has properties like rubber. TPE may include thermoplastic olefins (homopolymers or copolymers), for example, olefin thermoplastic elastomer (TPO) obtained by finely dispersing ethylene-propylene rubber (EPDM, EPM) in polypropylene (PP), or styrene thermoplastic elastomer (TPS) made of a copolymer of polystyrene (PS), polybutadiene, and the like. In the present embodiment, acrylonitrile ethylenepropylenediene styrene resin (AES resin) is used as the hard resin, and TPS is used as the soft resin.

Figure 4:
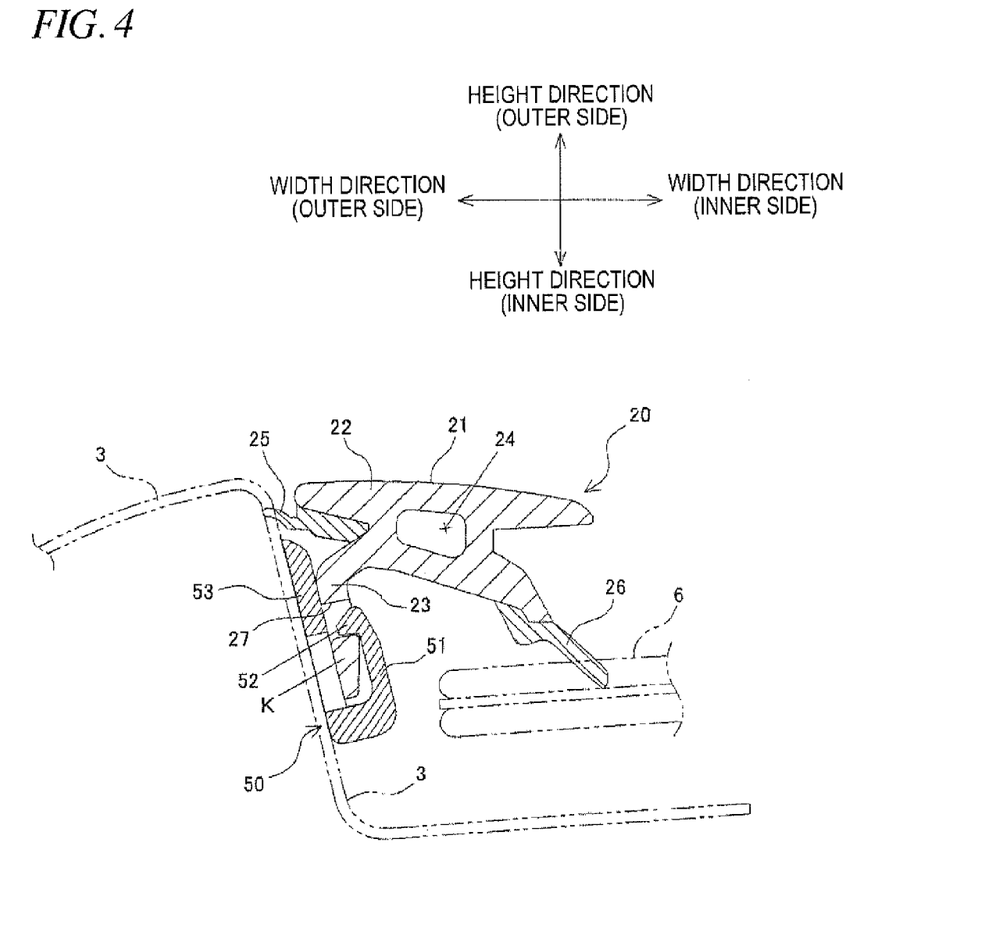
FIG. 4 is an enlarged cross-sectional view taken along line IV-IV of FIG. 2 in a mounting region to a side panel.

FIG. 4 illustrates a cross-section taken along line IV-IV of FIG. 2, that is, a cross-section at a position where an engaging portion K with a clip 50 is provided. In addition, in the cross-sectional views of FIGS. 4 and 5, respective upper, lower, left, and right directions/sides of sheet planes are referred to as follows from the points of sight (viewpoints) of the molding 20. That is, an upper-lower direction of each sheet plane is referred to as a "height direction", a left-right direction of the sheet plane is referred to as a "width direction", an upper side of the sheet plane is referred to as an "outer side in the height direction", a lower side of the sheet plane is referred to as an "inner side in the height direction", a left side of the sheet plane is referred to as an "outer side in the width direction", and a right side of the sheet plane is referred to as an "inner side in the width direction". In addition, the "outer side in the height direction" is also a front surface side of the window pane 6.

As illustrated in FIG. 4, the body portion of the molding 20 includes a head portion 22 and a leg portion 23. The "head portion 22" is a portion that is arranged at a front surface side of the window pane 6 and arranged at a vehicle outside (outer side in the height direction) than a window pane surface when the molding 20 is attached to the body panel. The head portion 22 exists over the entire longitudinal direction of the molding body portion, and the decorative surface 21 of the molding 20 is provided by an upper surface of the head portion 22. The "leg portion 23" is a portion that protrudes downward (inner side in the height direction) from a back surface near an outer peripheral side (outer side in the width direction) of the head portion 22 and that is located at an end surface side of a peripheral edge of the window pane 6 and faces an end surface of a window pane peripheral edge, when the molding 20 is attached to the body panel. Since the leg portion 23 is intermittently formed along the longitudinal direction of the molding body portion, the leg portion 23 does not exist at all positions in the longitudinal direction of the molding body portion but as illustrated in FIG. 4, is provided at least at a position that faces the clip 50. The head portion 22 and the leg portion 23 are basically integrally formed of the hard resin. A gas channel 24 that extends over the entire longitudinal direction is formed in a central zone (core portion) of the head portion 22. The gas channel 24 is a trace when a primary molded product (an integral product of the head portion 22 and the leg portion 23) made of the hard resin is molded through gas injection molding.

An outer seal lip 25 and an inner seal lip 26 are respectively provided at a position near the outer side of a back surface of the head portion 22 and a position near the inner side thereof. The seal lips 25 and 26 are made of the soft resin, and are molded integrally with the head portion 22 by secondary injection molding of the above-described primary molded product. As a tip portion of the outer seal lip 25 abuts against the body panel (3) and a tip portion of the inner seal lip 26 abuts against the window pane 6, a portion between the body panel (3) and the window pane 6 is sealed.

Moreover, at least a portion of the leg portion 23 illustrated in FIG. 4 is formed in a shape that can serve as the engaging portion K with the clip 50. Specifically, at a middle position of the height of the leg portion 23, an engaged hole 27 that penetrates a plate-shaped wall constituting the leg portion 23 in a thickness direction is formed. As illustrated by a dashed line in FIG. 7, the engaged hole 27 in each engaging portion K is provided as an elongated hole 27 that is horizontally long along the longitudinal direction of the molding. As mentioned above, one clip 50 corresponds to a pair of engaging portions K. Therefore, as illustrated in FIGS. 4 and 7, the clip 50 is formed with a pair of engaging tongue pieces 51 corresponding to the pair of engaging portions K, and a tip of each engaging tongue piece 51 is provided with a engaging protrusion 52 capable of being engaged into the engaged hole 27. As illustrated in FIG. 4, a slit-shaped storage space into which the engaging portion K of the leg portion 23 is insertable is secured between a main body back wall 53 of the clip 50 and the engaging tongue piece 51. By inserting the engaging portion K into this storage space from above, the engaging protrusion 52 of the engaging tongue piece 51 is engaged into the engaged hole 27 of the engaging portion K, and thereby, the mounting of the molding 20 to the clip 50 is completed.

Incidentally, the clip 50 as the mounting member is fixed to the side panel 3 via, for example, a metallic rivet (not shown). That is, a shank of the rivet is anchored to the side panel 3 by welding or the like so that a head portion of the rivet protrudes onto a molding mounting surface of the side panel 3. Meanwhile, the clip 50 includes a fitting recess 54 (refer to FIG. 7) capable of housing the head portion of the rivet between the pair of engaging tongue pieces 51. By fitting (externally fitting) the fitting recess 54 at the clip 50 side to the rivet head portion at the side panel 3 side, the clip 50 can be fixed onto the molding mounting surface of the side panel 3.

Figure 5:
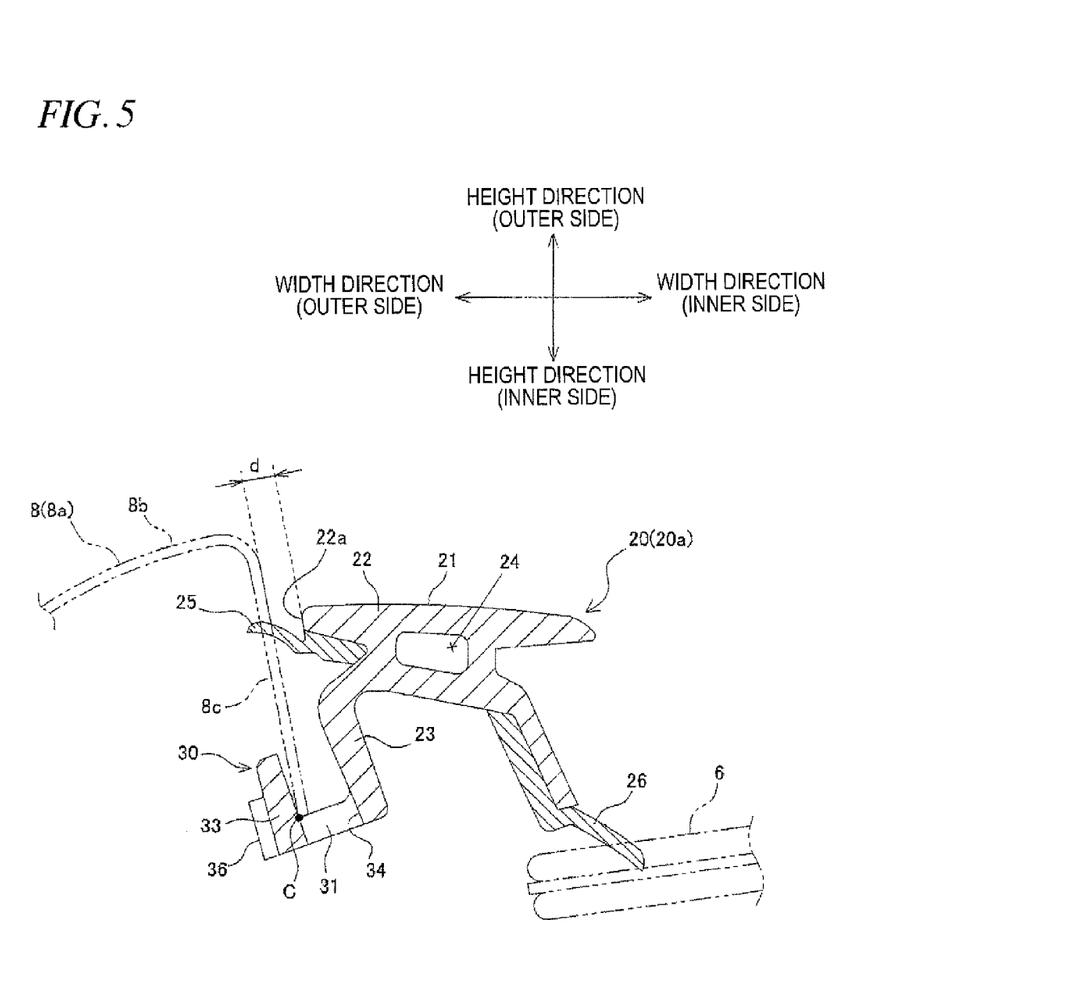
FIG. 5 is an enlarged cross-sectional view taken along line V-V of FIG. 2 in a mounting region to a fender panel.
Figure 6:
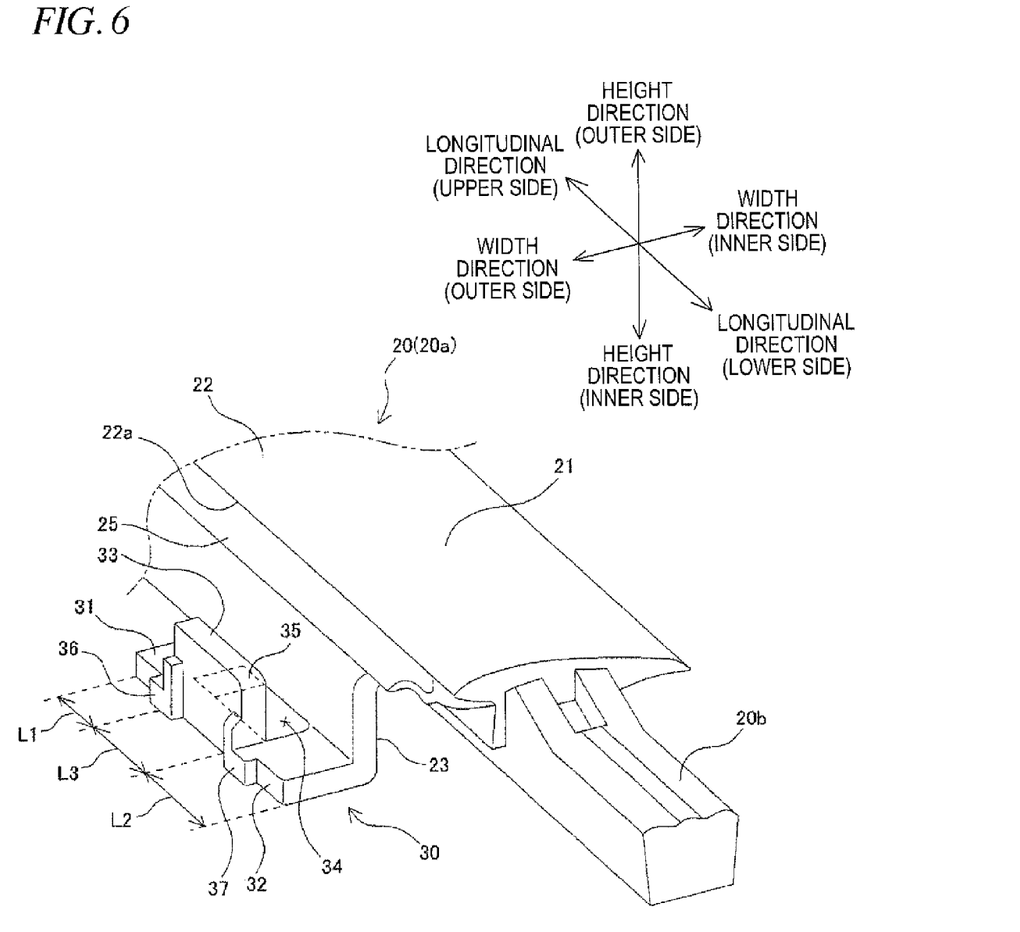
FIG. 6 is an enlarged perspective view of a lower terminal section of the molding having a receiving portion.

FIG. 5 illustrates a cross-section taken along line V-V of FIG. 2, that is, a cross-section at a position where the receiving portion 30 is provided. As illustrated in FIGS. 5 and 6, the lower terminal section 20a of the molding is provided with the receiving portion 30 in addition to the head portion 22, the leg portion 23, and the seal lips 25 and 26. The receiving portion 30 is formed integrally with the leg portion 23 on an outer surface of the leg portion 23. The receiving portion 30 further includes at least a pair of bottom wall portions (an upper bottom wall portion 31 and a lower bottom wall portion 32) provided so as to project toward the outer side in the width direction from a lower end edge of the leg portion 23, and a side wall portion 33 provided so as to project from tip positions (outer end positions) of the upper surfaces of the bottom wall portions toward the outer side in the height direction (front surface side of the window pane). Here, in the embodiment shown in FIGS. 5 and 6, although the side wall portion 33 is provided so as to project from the tip positions (outer end positions) of the upper surfaces of the bottom wall portions (31, 32) in the height direction, the side wall portion 33 may also be provided so as to project from intermediate positions (that is, positions slightly shifted toward the inner side than the tip portions) of the upper surfaces of the bottom wall portions (31, 32).

Meanwhile, as illustrated in FIGS. 5 and 7, the rear half upper end portion 8a of the fender panel 8 is provided with an edge portion 8c of the fender panel 8 formed so as to be folded toward the vehicle inside from the upper surface (fender panel decorative surface 8b) side of the fender panel 8. The edge portion 8c of the fender panel is located in the vicinity of the front lower end portion 3a of the side panel, and is provided as a straight portion (8c) that extends straight in a direction parallel to the longitudinal direction of the fender panel decorative surface 8b. The edge portion (straight portion 8c) of the fender panel 8 is inserted into the receiving portion 30 (see FIG. 7), and the lower terminal section 20a of the molding is positioned with respect to the rear half upper end portion 8a of the fender panel due to the engagement between the edge portion and the receiving portion.

The structure of the receiving portion 30 will be further described.

As illustrated in FIG. 6, the upper bottom wall portion 31 and the lower bottom wall portion 32 are arranged at a predetermined interval along the longitudinal direction of the molding. The side wall portion 33 is provided so as to couple an outer lower corner of the upper bottom wall portion 31 and an outer upper corner of the lower bottom wall portion 32. As a result, an opening 34 as a hole that penetrates in the height direction between the leg portion 23 and the side wall portion 33 is secured between the upper and lower bottom wall portions 31 and 32. Here, the opening 34 is a trace after a sliding type mold for molding the receiving portion 30 in injection molding comes off. In this way, the receiving portion 30 has a groove shape (or a gutter shape) that is surrounded from three directions by the leg portion 23, the two bottom wall portions 31 and 32, and the side wall portion 33, and both an upper end side end portion and a lower end side end portion of the groove shape (or a gutter shape) in the longitudinal direction are opened.

Respective upper surfaces of the upper and lower bottom wall portions 31 and 32 and an inner surface of the side wall portion 33 extend in the direction parallel to the longitudinal directions of the head portion 22 and the leg portion 23. Additionally, the side wall portion 33 is formed parallel to an outer edge 22a of the head portion 22. Moreover, as illustrated in FIG. 6, when the longitudinal length of the upper bottom wall portion 31 is defined as L1, the longitudinal length of the lower bottom wall portion 32 is defined as L2, and the longitudinal length of the side wall portion 33 is defined as L3, the length ratio of these three lengths is set L1:L2:L3=1:1:2. That is, the lengths are set so that the sum total (L1+L2) of the longitudinal lengths of the upper and lower bottom wall portions 31 and 32 and the longitudinal length of the side wall portion 33 (L3) are equal to each other. Additionally, the longitudinal length (L1+L2+L3) of the receiving portion 30 is set to a length that does not exceed the length of the straight portion 8c.

Among two corner portions located at the tip (height direction outer end) of the side wall portion 33, a corner portion 35 located at a lower side when the molding 20 is attached to the vehicle is formed in a chamfered shape that is curved in a round shape as viewed from a lateral side (from the outer side in the width direction). This is provided so that the corner portion 35 is not easily caught in the fender panel 8 when the molding 20 is attached to the fender panel 8.

A pair of upper and lower reinforcing portions 36 and 37 are provided at an outer surface side of the receiving portion 30 of the side wall portion 33. The upper reinforcing portion 36 located at an upper side in the longitudinal direction is formed as a thick portion that protrudes to the outer side in the width direction in a connection region between the side wall portion 33 and the upper bottom wall portion 31 and reinforces the coupling between the side wall portion 33 and the upper bottom wall portion 31. Similarly, the lower reinforcing portion 37 located at a lower side in the longitudinal direction is formed as a thick portion that protrudes to the outer side in the width direction in a connection region between the side wall portion 33 and the lower bottom wall portion 32 and reinforces the coupling between the side wall portion 33 and the lower bottom wall portion 32. By the reinforcing portions 36 and 37, the strength of the receiving portion 30 improves and the durability of the receiving portion 30 increases.

In addition, as illustrated in FIGS. 3, 6, and 7, a lower end extended section 20b is provided at the molding 20 so as to extend further from the tip of the lower terminal section 20a. The lower end extended section 20b supports the baffle plate 10, which is placed thereon, from below, and positions the baffle plate 10 together with the fender panel 8 or the like.

The molding 20 of the present embodiment is attached to the body panel (3, 8) of the vehicle in a manner shown in FIG. 7. Specifically, first, the receiving portion 30 of the lower terminal section 20a of the molding is made to get under the back surface side of the rear half upper end portion 8a of the fender panel. By inserting the molding 20 obliquely downward from the front lower end portion 3a side of the side panel toward the rear half upper end portion 8a of the fender panel, and by making the molding 20 slide along the edge portion (straight portion 8c) of the fender panel, a portion of the straight portion 8c of a fender panel is received in the receiving portion 30 (between the side wall portion 33 and the leg portion 23) (see FIG. 5). Next, the five engagement pairs (K, K) on the molding 20 side are sequentially engaged with the five clips 50 fixed to the side panel 3 in advance. Usually, since a position of the clip 50 at the uppermost side becomes a standard when the molding 20 is positioned, the engagement pair (K, K) is engaged in sequence from the upper clip 50. When an engagement pair (K, K) is engaged with the clip 50 at the lowermost side in this way, the attachment of the molding 20 to the body panel (3, 8) is completed.

Although a method for attaching the molding 20 in a case where the clips 50 are fixed to the side panel 3 in advance has been described in the above paragraph, it is also possible to engage the respective clips 50 with the engagement pairs (K, K) of the molding 20 in advance, and then attach the molding 20 with the clips 50 to the rivet head portion of the side panel 3. Further, in the attaching method of attaching the molding 20 which was explained with reference to FIG. 7, although the molding 20 was made to slide along the edge portion (straight portion 8c) of the fender panel, the attaching method is not limited thereto. Alternatively, the molding 20 may be attached by pushing the molding 20 in the vehicle width direction toward the fender panel 8.

When the attachment of the molding 20 to the body panel (3, 8) is completed, as illustrated in FIG. 5, the tip portion (lower end portion in FIG. 5) of the edge portion 8c of the fender panel is arranged at the corner portion C (or its close vicinity) at a position where the upper surface of the bottom wall portions 31 or 32 and the inner surface of the side wall portion 33 intersect each other. In this state, the position of the molding 20 in the height direction with respect to the fender panel 8 (especially, lifting in the outer side in the height direction) is regulated due to the engagement between the bottom wall portions 31 and 32 of the receiving portion and the tip portion of the edge portion 8c of the fender panel. Additionally, the position of the molding 20 in the width direction with respect to the fender panel 8 (especially, escape to the inner side in the width direction) is regulated due to the engagement between the side wall portion 33 of the receiving portion and the edge portion 8c of the fender panel. For this reason, even if there is a deviation in the position of the tip portion of the edge portion 8c of the fender panel in an actual vehicle, since the relative positional relationship between the fender panel 8 and the molding 20 is determined by the engagement relationship described above, the clearance d between the fender panel 8 and the molding 20 can be prevented from becoming excessively large and the molding 20 can be prevented from rattling. Further, a situation where the molding 20 is lifted with respect to the fender panel 8 due to an unintended external force (see force F of FIG. 8) can be avoided.

According to the present embodiment, the functions and effects as listed hereinafter are also exhibited in addition to the above-described basic functions and effects.

The lower terminal section 20a of the molding can be stably fixed to the fender panel 8 due to the engagement relationship between the receiving portion 30 and the edge portion 8c of the fender panel, even without installing the mounting members, such as the clips 50, to the fender panel 8.

Since the receiving portion 30 is formed integrally with the leg portion 23, there is no need to newly mount a receiving portion equivalent member that is separately provided, and an increase in the number of parts can be prevented.

Since the receiving portion 30 of the lower terminal section 20a of the molding has a groove shape (or a gutter shape) and the lower end side of the groove shape is opened, it is possible to receive the tip portion of the edge portion 8c of the fender panel into the receiving portion 30 from the lower end side of the receiving portion 30 while being made to slide relatively. Accordingly, it becomes easier to attach the lower terminal section 20a of the molding to the fender panel 8.

Since the respective upper surfaces of the upper and lower bottom wall portions 31 and 32 and the inner surface of the side wall portion 33 extend in the direction parallel to the longitudinal directions of the head portion 22 and the leg portion 23, even when the molding 20 has thermally expanded or thermally contracted in its longitudinal direction due to environmental factors, such as a change in temperature, the receiving portion 30 does not hinder such thermal expansion or thermal contraction.

Since the side wall portion 33 of the receiving portion and the outer edge 22a of the head portion are parallel to each other, the distance (d) between the head portion 22 and the fender panel 8 becomes almost constant at any position in the longitudinal direction when the molding 20 is attached to the vehicle. As a result, appearance can be improved.

Since the sum total (L1+L2) of the longitudinal lengths of the upper and lower bottom wall portions 31 and 32 and the longitudinal length (L3) of the side wall portion 33 are equal to each other, the rigidity of the bottom wall portions 31 and 32 and the rigidity of the side wall portion 33 are made substantially uniform. This makes a reaction force against a force with which the tip portion of the fender panel edge portion 8c pushes the bottom wall portions 31 and 32 of the receiving portion and a reaction force against a force with which the edge portion 8c of the fender panel pushes the side wall portion 33 of the receiving portion to be substantially balanced with each other, and strain or deformation of the receiving portion 30 can be avoided thereby.

[Other Embodiments]

Figure 8:
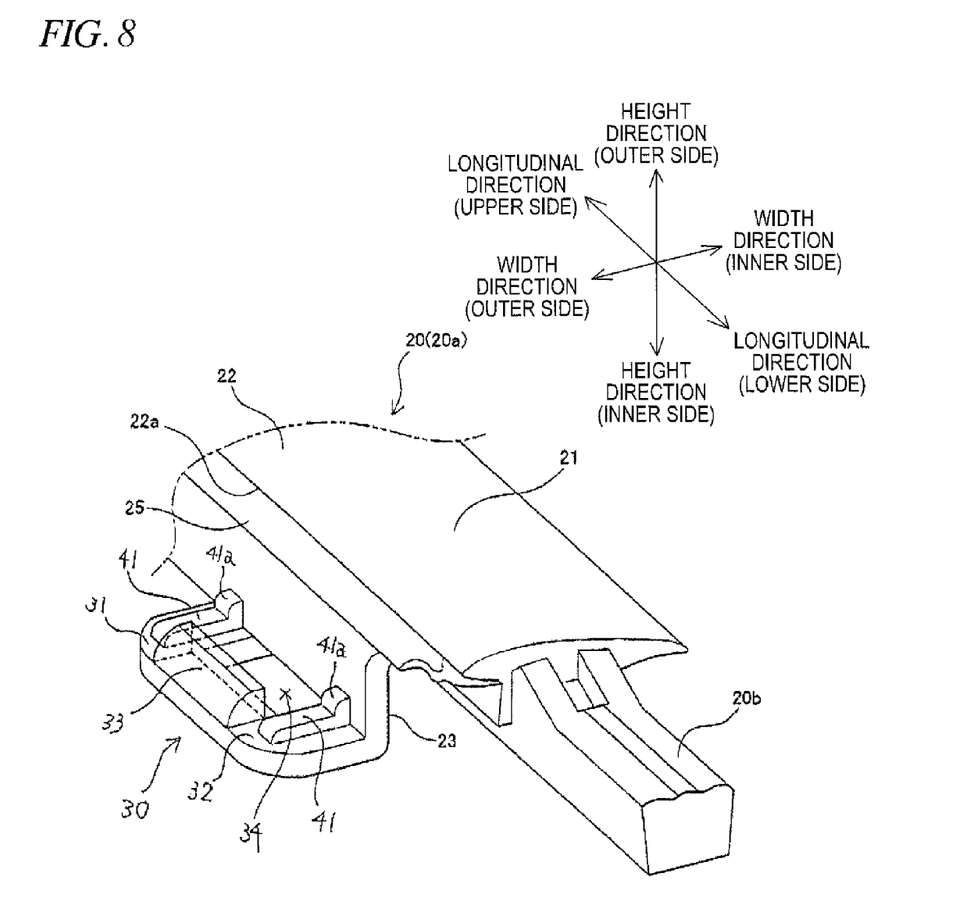
FIG. 8 is an enlarged perspective view of a lower terminal section of a molding according to another embodiment.
Figure 9:
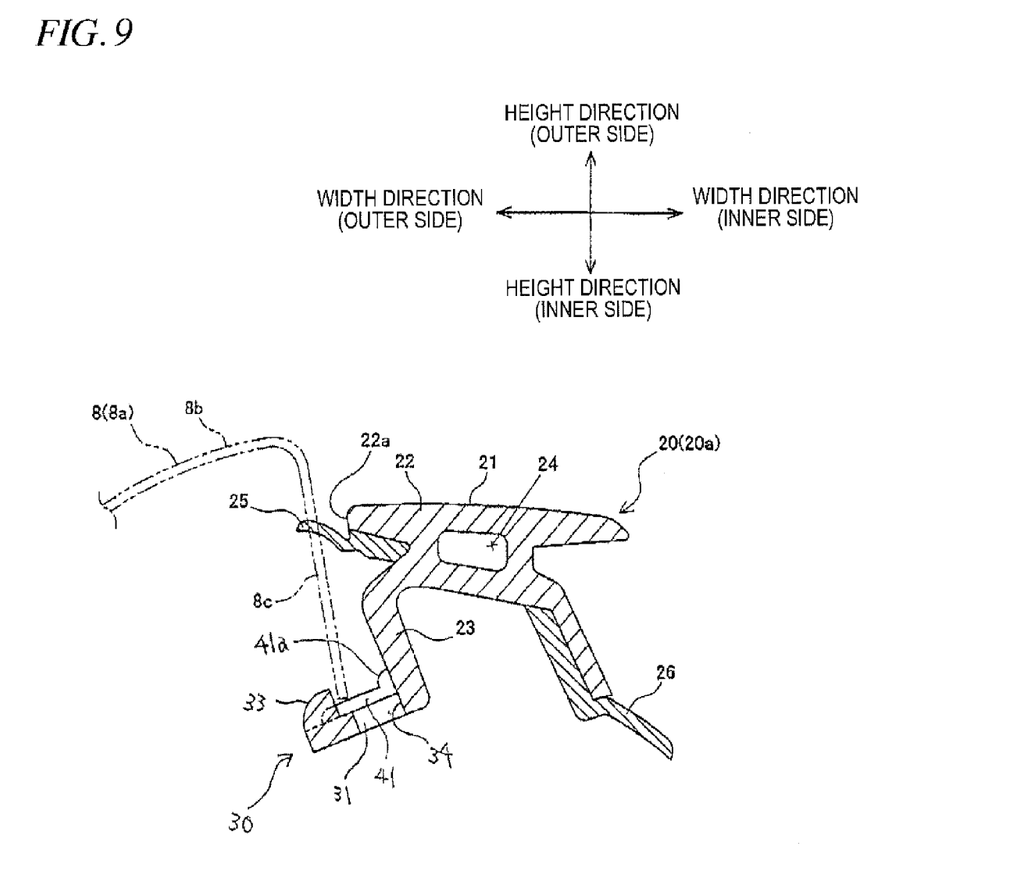
FIG. 9 is an enlarged cross-sectional view of FIG. 8, which corresponds to FIG. 5.

A protruding portion for reinforcing the receiving portion 30 may be additionally formed to at least one surface among the upper surface of the bottom wall portion (31, 32), the inner surface of the side wall portion 33 and the outer surface of the leg portion 23. For example, as shown in FIGS. 8 and 9, a rib-shaped protruding portion 41 may be formed on the upper surfaces of each of the upper bottom wall portion 31 and the lower bottom wall portion 32. Each protruding portion 41 is formed in an L-shape which extends from each of the corresponding bottom wall portions 31, 32 to the leg portion 23. As a result, each protruding portion 41 (especially, a portion along the upper surface of the bottom wall portion) extends in a direction that intersects with (is substantially perpendicular to) the longitudinal direction of the leg portion 23. The pair of protruding portions 41 provided to the receiving portion 30 in FIGS. 8 and 9 improves the rigidity of the receiving portion 30 and reinforces the mechanical strength of the receiving portion 30.

Here, in FIG. 8, the protruding portions 41 for reinforcing the receiving portion are provided in same numbers and in same shapes to each of the upper bottom wall portion 31 and the lower bottom wall portion 32. However, the protruding portion 41 may be provided in different numbers and in different shapes, depending on a portion to be reinforced (bottom wall portions 31, 32, side wall portion 33 and leg portion 23). As an example, the protruding portions may be provided in different numbers and/or in different shapes in the following manners: "one protruding portion is provided to the upper bottom wall portion 31 and two protruding portions are provided to the lower bottom wall portion 32"; "one protruding portion is provided to the upper bottom wall portion 31, one protruding portion is provided to the lower bottom wall portion 32 and one protruding portion is provided to the side wall portion 33"; and "a semicircular column-shaped protruding portion is provided to the upper bottom wall portion 31 and a trapezoidal-shaped protruding portion is provided to the lower bottom wall portion 32".

Further, when attaching the molding 20 to the body panel (3, 8), the edge portion 8c of the fender panel may be positioned in the receiving portion 30 by abutting the tip portion of the edge portion 8c of the fender panel on the front surface of the protruding portion 41. Alternatively, the edge portion 8c of the fender panel may be positioned in the receiving portion 30 by abutting a surrounding portion of the edge portion 8c (outer surface or inner surface of the edge portion 8c) of the fender panel other than the tip portion of the edge portion 8c on the protruding portion 41. Here, it is preferable that a position of the protruding portion 41 (for example, corner positions 41a shown in FIGS. 8 and 9), which may come into contact with the tip portion of the edge portion 8c of the fender portion (or any other members) when attaching the molding 20, is formed in a chamfered shape (for example, an R-shape).

The shapes of the protruding portions 41 exemplified in FIGS. 8 and 9 can be set and changed easily as compared to other members (bottom wall portions 31, 32, side wall portion 33, etc.). Accordingly, there is an advantage that it is easy to cope with the deviation in the position of the tip portion of the edge portion 8c of the fender panel.

What is claimed is:

1. An elongated molding for a vehicle, which is attached between a peripheral edge of a window pane and a body panel, the elongated molding comprising:
  a body portion, the body portion including:
    a head portion configured to be arranged at a front surface side of the window pane when the elongated molding is attached to the vehicle; and
    a leg portion protruding from a back surface of the head portion, the leg portion configured to be arranged at an end surface side of the window pane when the elongated molding is attached to the vehicle, and
  a receiving portion, which is configured to receive a tip portion of an edge portion of a fender panel that faces the elongated molding, wherein
    the elongated molding has a lower terminal section, which is a portion of the elongated molding located lower than a boundary between a side panel and the fender panel, the side panel and the fender panel constituting the body panel, the lower terminal section being configured to face the fender panel when the elongated molding is attached to the vehicle;

the receiving portion is formed integrally with the leg portion on an outer surface of the leg portion;

the receiving portion includes (i) a bottom wall portion projecting toward an outer side from the leg portion of the lower terminal section, and (ii) a side wall portion projecting from an upper surface of the bottom wall portion toward the front surface side of the window pane;

the body portion, the bottom wall portion and the side wall portion are formed by a same material;

in a longitudinal direction of the elongated molding, the receiving portion is formed at a lower side of the elongated molding; and in a width direction of the elongated molding, an inner surface of the side wall portion is spaced outwards of an outer edge of the head portion.

2. The elongated molding for the vehicle according to claim 1, wherein the receiving portion has a groove shape that is surrounded in three directions by the leg portion, the bottom wall portion, and the side wall portion, and at least a lower end side of both longitudinal ends of the groove shape is opened.

3. The elongated molding for the vehicle according to claim 2, wherein the upper surface of the bottom wall portion and an inner surface of the side wall portion extend in a direction parallel to a longitudinal direction of the head portion.

4. The elongated molding for the vehicle according to claim 1, wherein the side wall portion is parallel to the outer edge of the head portion.

5. The elongated molding for the vehicle according to claim 1, wherein a longitudinal length of the bottom wall portion and a longitudinal length of the side wall portion are substantially equal to each other.

6. The elongated molding for the vehicle according to claim 1, wherein, among two corner portions located at a tip of the side wall portion, a corner portion located at a lower side when the elongated molding is attached to the vehicle has a chamfered shape.

7. The elongated molding for the vehicle according to claim 1, wherein a protruding portion is located at a position facing the tip portion of the edge portion of the fender panel, and is provided to the at least one surface; and the protruding portion protrudes from at least one surface among the following surfaces: (i) the upper surface of the bottom wall portion (ii) an inner surface of the side wall portion; and (iii) the outer surface of the leg portion.

8. An attachment structure of an elongated molding in a vehicle, the attachment structure comprising:

the elongated molding for the vehicle, which is attached between a peripheral edge of a window pane and a body panel, the elongated molding comprising:

a body portion, the body portion including:

a head portion configured to be arranged at a front surface side of the window pane when the elongated molding is attached to the vehicle; and a leg portion protruding from a back surface of the head portion, the leg portion configured to be arranged at an end surface side of the window pane when the elongated molding is attached to the vehicle, and a receiving portion, which is configured to receive a tip portion of an edge portion of a fender panel that faces the elongated molding, wherein the elongated molding has a lower terminal section, which is a portion of the elongated molding located lower than a boundary between a side panel and the fender panel, the side panel and the fender panel constituting the body panel, the lower terminal section being configured to face the fender panel when the elongated molding is attached to the vehicle:

the receiving portion is formed integrally with the leg portion on an outer surface of the leg portion;

the receiving portion includes (i) a bottom wall portion projecting toward an outer side from the leg portion of the lower terminal section, and (ii) a side wall portion projecting a from an upper surface of the bottom wall portion toward the front surface side of the window pane;

the body portion, the bottom wall portion and the side wall portion are formed by a same material;

in a longitudinal direction of the elongated molding, the receiving portion is formed at a lower side of the elongated molding; and in a width direction of the elongated molding, an inner surface of the side wall portion is spaced outwards of an outer edge of the head portion, and the body panel including the side panel and the fender panel, wherein the edge portion of the fender panel is provided in the vicinity of a region adjacent to the side panel; and the elongated molding is mounted to the fender panel in a state where the receiving portion of the elongated molding receives the tip portion of the edge portion of the fender panel that faces the elongated molding.

9. The attachment structure of the elongated molding in the vehicle according to claim 8, wherein the edge portion of the fender panel is a straight portion that extends straight in a direction parallel to a longitudinal direction of a decorative surface of the fender panel, and the straight portion is inserted into the receiving portion.

10. The attachment structure of the elongated molding in the vehicle according to claim 8, wherein a baffle plate is arranged lower than the receiving portion of the elongated molding and lower than the side panel.

11. An attachment structure of an elongated molding in a vehicle, the attachment structure comprising:

the elongated molding, which is attached between a peripheral edge of a window pane and a body panel, the elongated molding comprising:

a body portion, the body portion including:

a head portion configured to be arranged at a front surface side of the window pane when the elongated molding is attached to the vehicle; and a leg portion protruding from a back surface of the head portion, the leg portion being configured to be arranged at an end surface side of the window pane when the elongated molding is attached to the vehicle; and a receiving portion, which is configured to receive a tip portion of an edge portion of a fender panel that faces the elongated molding, the body panel includes a side panel and the fender panel, wherein the elongated molding has a lower terminal section, which is a portion of the elongated molding located lower than a boundary between the side panel and the fender panel and configured to face the fender panel when the elongated molding is attached to the vehicle;

the receiving portion is formed integrally with the leg portion on an outer surface of the leg portion;

the receiving portion includes (i) a bottom wall portion projecting toward an outer side from the leg portion of the lower terminal section, and (ii) a side wall portion projecting from an upper surface of the bottom wall portion toward the front surface side of the window pane;

the edge portion of the fender panel is provided in the vicinity of a region adjacent to the side panel;

the elongated molding is mounted to the fender panel in a state where the receiving portion of the elongated molding receives the tip portion of the edge portion of the fender panel that faces the elongated molding; and the side panel and the fender panel are arranged side by side in a longitudinal direction of the elongated molding.

12. The attachment structure of the elongated molding in the vehicle according to claim 11, wherein the edge portion of the fender panel is a straight portion that extends straight in a direction parallel to a longitudinal direction of a decorative surface of the fender panel, and the straight portion is inserted into the receiving portion.

13. The attachment structure of the elongated molding in the vehicle according to claim 11, wherein a baffle plate is arranged lower than the receiving portion of the elongated molding and lower than the side panel.

14. The elongated molding for the vehicle according to claim 1, wherein the receiving portion has an opening that extends in a height direction.

15. The attachment structure of the elongated molding in the vehicle according to claim 11, wherein the receiving portion has an opening that extends in a height direction.

\* \* \* \* \*